United States Patent
Anwar et al.

(10) Patent No.: US 7,029,077 B2
(45) Date of Patent: *Apr. 18, 2006

(54) METHOD AND APPARATUS FOR POWER MANAGEMENT OF A REGENERATIVE BRAKING SYSTEM

(75) Inventors: Sohel Anwar, Canton, MI (US); Carl David Klaes, Livonia, MI (US); Kevin J Pavlov, Livonia, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 56 days.

This patent is subject to a terminal disclaimer.

(21) Appl. No.: 10/644,909

(22) Filed: Aug. 20, 2003

(65) Prior Publication Data

US 2004/0035656 A1    Feb. 26, 2004

Related U.S. Application Data (60) Provisional application No. 60/404,680, filed on Aug. 20, 2002.

(51) Int. Cl.
*G60T 8/64* (2006.01)
*G60T 7/00* (2006.01)

(52) U.S. Cl. .......................... 303/152; 701/22

(58) Field of Classification Search ........ 188/156–164; 303/20, 151, 152, 155; 701/22, 70, 93; 180/65.1–65.7
See application file for complete search history.

(56) References Cited

U.S. PATENT DOCUMENTS

| | | | |
|---|---|---|---|
| 3,963,372 A | 6/1976 | McLain et al. | |
| 4,719,861 A | 1/1988 | Savage et al. | |
| 5,050,936 A | 9/1991 | Tanaka et al. | |
| 5,362,135 A | 11/1994 | Riddiford et al. | |
| 5,615,933 A | 4/1997 | Kidston et al. | |
| 5,734,238 A | 3/1998 | Yanagisawa et al. | |
| 5,751,137 A | 5/1998 | Kiuchi et al. | |
| 5,788,597 A | 8/1998 | Boll et al. | |
| 5,839,800 A | 11/1998 | Koga et al. | |
| 5,857,755 A | 1/1999 | Aoki et al. | |
| 5,867,009 A | 2/1999 | Kiuchi et al. | |
| 5,910,722 A | 6/1999 | Lyons et al. | |
| 5,941,328 A | 8/1999 | Lyons et al. | |
| 6,021,365 A | 2/2000 | Ishii et al. | |
| 6,086,166 A | 7/2000 | Fukasawa | |
| 6,116,368 A | 9/2000 | Lyons et al. | |
| 6,120,115 A | 9/2000 | Manabe | |
| 6,122,587 A | 9/2000 | Takahara et al. | |
| 6,122,588 A | 9/2000 | Shehan et al. | |
| 6,179,395 B1 | 1/2001 | Schneider | |
| 6,216,808 B1 | 4/2001 | Kuno et al. | |
| 6,231,134 B1 | 5/2001 | Fukasawa et al. | |

(Continued)

FOREIGN PATENT DOCUMENTS

EP    0 867 323 A2    3/1998

(Continued)

*Primary Examiner*—Xuan Lan Nguyen
(74) *Attorney, Agent, or Firm*—Brinks Hofer Gilson & Lione (57) ABSTRACT

A vehicle braking system and method of control is disclosed which includes electromagnetic and friction braking functionality. The electromagnetic braking system includes a generator which supplies power to eddy current devices. Accordingly, the eddy current devices apply a retarding torque on the wheels of the vehicle. In the event the generator produces an amount of power greater than that needed by the electromagnetic braking system, the generator will supply power to a supplemental power source such as a battery.

13 Claims, 4 Drawing Sheets

U.S. PATENT DOCUMENTS

| | | |
|---|---|---|
| 6,231,135 B1 | 5/2001 | Bower et al. |
| 6,244,674 B1 | 6/2001 | Kuno et al. |
| 6,871,919 B1 * | 3/2005 | Anwar et al. ............... 303/152 |

FOREIGN PATENT DOCUMENTS

| | | |
|---|---|---|
| EP | 0 901 930 A1 | 9/1998 |

* cited by examiner

METHOD AND APPARATUS FOR POWER MANAGEMENT OF A REGENERATIVE BRAKING SYSTEM

CROSS REFERENCE TO RELATED APPLICATIONS

This application claims priority of provisional patent application Ser. No. 60/404,680 filed Aug. 20, 2002.

STATEMENT REGARDING FEDERALLY SPONSORED RESEARCH

Not Applicable.

BACKGROUND OF THE INVENTION

1. Field of the Invention

The present invention relates in general to a vehicle braking system and, more specifically, to a power management system for a vehicle braking system having electromagnetic and friction braking.

2. Description of the Related Art

Hybrid braking systems for vehicles are well known. These braking systems usually include electromagnetic and friction braking capabilities. The use of electromagnetic braking improves efficiency in vehicles by recovering kinetic energy produced by the vehicle with an electric machine. The electric machine generates electric energy that is applied to electromagnetic retarders (also referred to as eddy current devices) within the braking system. In some instances, the electric machine generates an amount of power in excess of the amount required by the eddy current devices. When this occurs, prior art braking systems have disclosed methods of recovering the excess energy to power other components or to charge the vehicle battery. However, these prior art systems have proved to be costly and largely inefficient. Further, the determination of whether a surplus of power is available from the generator requires additional hardware.

It would therefore be desirable to provide a hybrid braking system that reduces the amount of hardware and efficiently distributes the energy generated within the braking system thereby utilizing any excess energy generated by the generator to charge a supplemental power source such as a battery.

SUMMARY OF THE INVENTION

The present invention overcomes the disadvantages of the prior art approaches by providing a an apparatus and a method of controlling power for a braking system, which permits use of electromagnetic and friction braking.

A method of operation is included which comprises the step of determining a throttle position of a vehicle based on inputs from a throttle position sensor The step of comparing the throttle position to a predetermined throttle position threshold is included. The method generates a signal for the battery switch to decouple the battery from the generator thereby preventing charging of the battery when the throttle position is greater than the predetermined throttle position threshold. The method compares the brake pedal position signal to a predetermined brake pedal threshold when the throttle position is less than the predetermined throttle position threshold. The battery switch decouples the battery from the generator when the brake pedal position signal is greater than the predetermined brake pedal threshold and the throttle position is less than the predetermined throttle position threshold. The wheel speed sensor signal based on the wheel speed is compared to a predetermined wheel speed threshold when the brake pedal position signal is less than the predetermined brake pedal threshold and the throttle position is less than the predetermined throttle position threshold. The method generates a signal for the battery switch to decouple the battery from the generator when the wheel speed is less than the predetermined wheel speed threshold, the brake pedal position signal is less than the predetermined brake pedal threshold, and the throttle position is less than the predetermined throttle position threshold. When the wheel speed is greater than the predetermined wheel speed threshold, the method generates a signal for the battery switch to decouple the battery from the generator if the generator output voltage is less than battery voltage. A signal is generated to electrically couple the battery to the generator thereby enabling the generator to charge the battery when the generator output voltage is greater than the battery voltage, the wheel speed is greater than the predetermined wheel speed threshold, the throttle position is less than the predetermined throttle position threshold, and the brake pedal position signal is less than the predetermined brake pedal threshold.

DETAILED DESCRIPTION OF PREFERRED EMBODIMENTS

Figure 1:
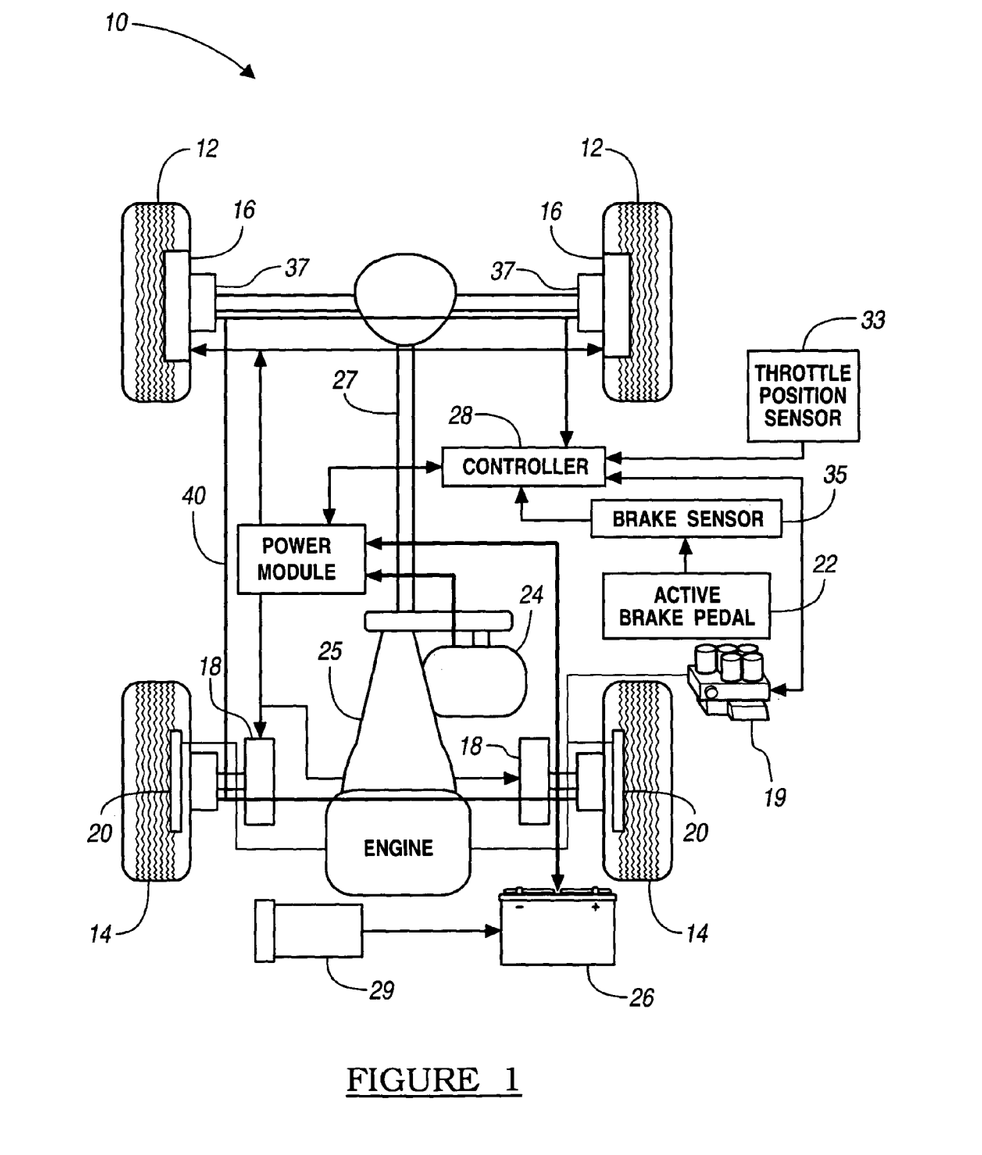
FIG. 1 is a hardware diagram of a motor vehicle having a electromagnetic and friction braking system according to the present invention.

Referring to FIG. 1, an electromagnetic and friction braking system 10 for a vehicle is illustrated which includes left and right rear wheels 12 and left and right front wheels 14. The front wheels 14 have respective hydraulic friction brakes 20 coupled thereto. An active brake pedal 22 is coupled to a brake pedal sensor wherein the brake pedal sensor generates a braking demand signal for a controller 28. The electromagnetic and friction braking system 10 is actuated when the brake pedal 22 is placed in a predetermined brake pedal position by a vehicle operator. Preferably, the predetermined brake pedal position occurs when the brake pedal 22 is in a depressed position. The front and rear wheels 14 and 12 are coupled to front and rear eddy current devices 18 and 16. In a preferred embodiment, there are four eddy current devices wherein each wheel has an eddy current device connected thereto. The front and rear eddy current devices 18 and 16 are electromagnetic retarders which produce a braking force in the form of a retarding torque on the front and rear wheels 14 and 12 when energized. The front eddy current devices 18 are mounted on a sprung mass with the chassis of the vehicle. The rear eddy current devices 16 are mounted on the rear wheel hubs. A power module 40 is electrically coupled to the front and rear eddy current devices 18 and 16 and a controller 28. The power module 40 receives signals from the controller 28 and generates signals for the controller 28 and the front and rear eddy current devices 18 and 16. A generator 24 is mounted on the end of a transmission 25 and coupled to a drive shaft 27. The generator 24 is preferably a three-phase synchronous brush type having excitation and output windings. An alternate embodiment of the generator 24 is a three-phase brushless hompolar type. The generator 24 is electrically connected to the controller 28 and the front and rear eddy current devices 18 and 16. The generator 24 supplies power to the front and rear eddy current devices 18 and 16. The generator 24 is also capable of supplying power to a battery 26 when a brake pedal sensor 35 senses that the vehicle operator has placed the brake pedal 22 in the depressed position. The operating voltage of the generator 24 is about 42 volts. An alternator 29 is mounted directly on an engine 31 and also charges the battery 26. The battery 26 is capable of supplying power to the front and rear eddy current devices 18 and 16 to enhance braking performance or when the generator 24 does not produce an adequate amount of power for the front and rear eddy current devices 18 and 16. The battery 26 has a voltage of thirty-six volts and is chargeable up to forty-two volts. A wheel speed sensor 37 is coupled to the front and rear wheels 14 and 12 and generates a signal for the controller 28 that corresponds to the speed of the wheels. An alternate embodiment has only a single wheel speed sensor that is coupled to a vehicle differential or only one wheel of the vehicle.

The brake pedal sensor 35 inputs the position of the brake pedal 22 into the controller 28. A throttle position sensor 33 generates a signal for the controller 28 that corresponds to the position of the throttle (not shown). The position of the throttle varies as the vehicle operator presses an accelerator pedal. The controller 28 stores an actual power output of the generator 24 based on the amount of voltage and current produced by the generator 24. The controller 28 also stores in memory a predetermined throttle position based on the position of the throttle. Preferably, the predetermined throttle position ranges from five to ten degrees from a non-depressed position. It is recognized that the predetermined throttle position range is vehicle dependent and can vary accordingly. For instance, the range may be fifteen to twenty degrees from the non-depressed position. The controller 28 also stores in memory an elapsed energization time, a predetermined ramp time, and a power consumption requirement of the front and rear eddy current devices 18 and 16. The elapsed energization time is the elapsed time since the vehicle operator has made a braking demand, i.e. pressed the brake pedal. The predetermined ramp time is the amount of time required for the generator 24 to respond to the pressing of the brake pedal 22. During the predetermined ramp time, the battery 26 will supply power to the eddy current devices 16 and 18. The power consumption requirement of the front and rear eddy current devices 18 and 16 is the amount of power required by the front and rear eddy current devices 18 and 16 as requested by the vehicle operator when the brake pedal 22 is pressed. In addition, when the friction brake 20 is activated, the controller 28 generates a signal for a driver module 19. The driver module 19 controls the amount of hydraulic pressure within the friction brake system. In response to the signal from controller 28, the driver module 19 activates valves within the friction brake system to either increase or decrease the level of hydraulic pressure.

Figure 2:
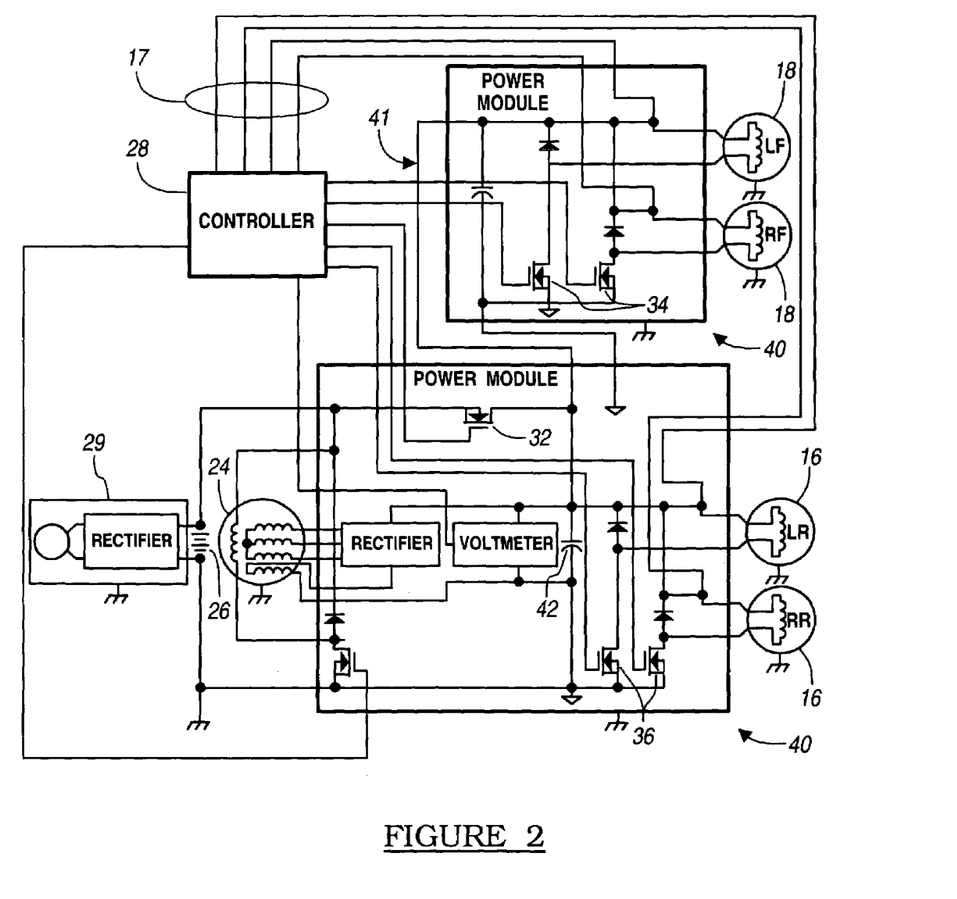
FIG. 2 is an electrical schematic of a electromagnetic braking system according to the present invention.
Figure 4:
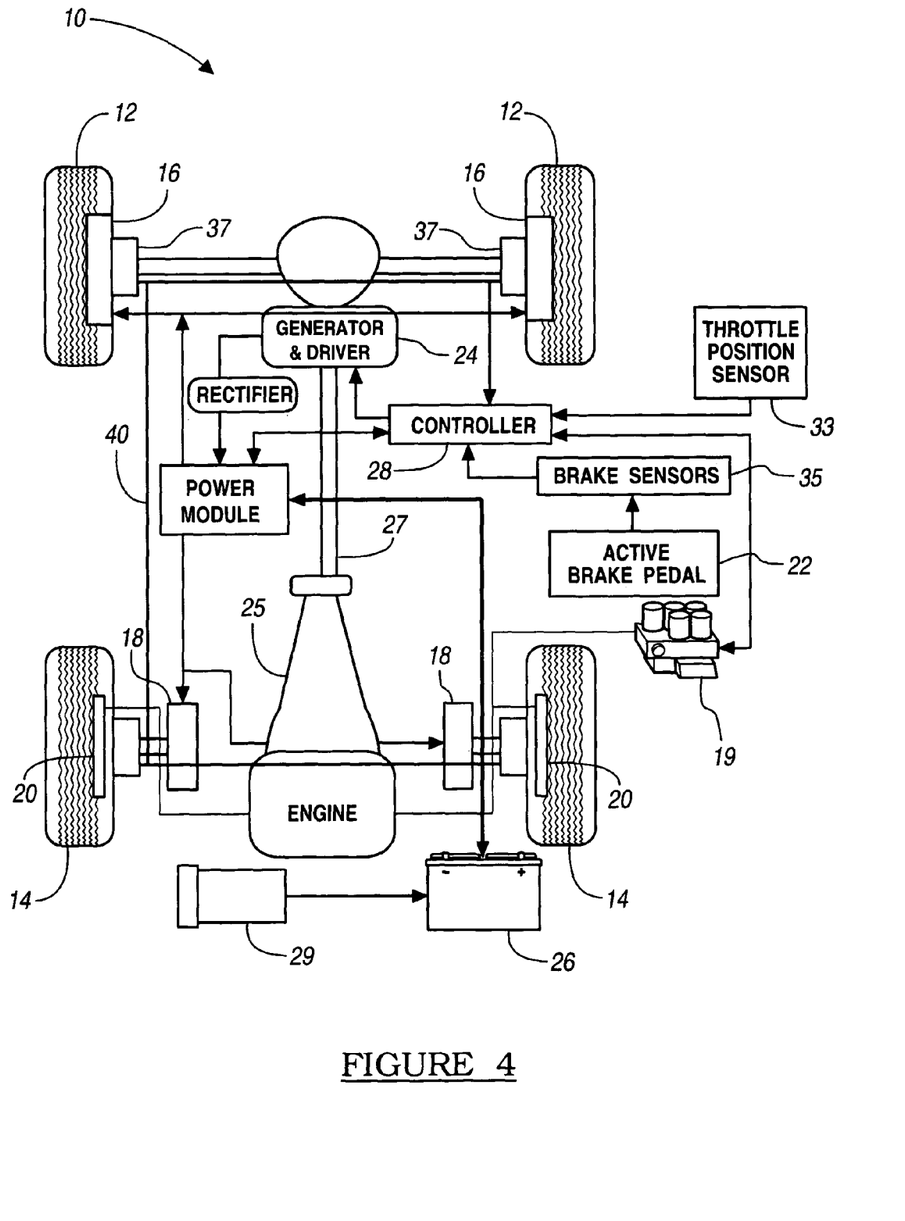
FIG. 4 is a hardware diagram of a motor vehicle having an electromagnetic and friction braking system according to the present invention

In FIG. 2, there is illustrated an electrical schematic for the electromagnetic and friction braking system 10. As the generator 24 generates power, the output is rectified and applied to a capacitor 42. The capacitor 42 stabilizes the rectified output of the generator 24. When the battery switch 32 is closed the battery 26 supplies power to a power rail 41. The power rail 41 is a voltage summing junction for the generator 24 and the battery 26. The power rail 41 provides the electrical connection between the battery switch 32 and the front and rear eddy current devices 18 and 16. After the power module 40 receives signals from the controller 28, either the generator 24 or the battery 26 energizes the front and rear eddy current devices 18 and 16. The power module 40 includes front eddy current switches 34 and rear eddy current switches 36. The controller 28 generates signals for the power module 40. Preferably, the signals generated for the power module 40 are pulse-width-modulated. Thereafter, either the generator 24 or the battery 26 according to the method below energizes the front and rear eddy current devices 18 and 16. The controller 28 monitors the current draw of the front and rear eddy current devices 18 and 16 The controller 28 monitors the current draw of the front and rear eddy current devices 18 and 16 by receiving a current feed back signal over a power line 17 A voltmeter enables the controller 28 to monitor the rectified output voltage of the generator 24. FIG. 4 illustrates an alternate configuration of the electromagnetic and friction braking system 10. Duplicate reference numerals are used for components common with FIG. 1. The embodiment in FIG. 4 differs from FIG. 1 in that the generator 24 mechanically engages the driveshaft 27 at an opposite end of the driveshaft 27 from the transmission 25.

Figure 3:
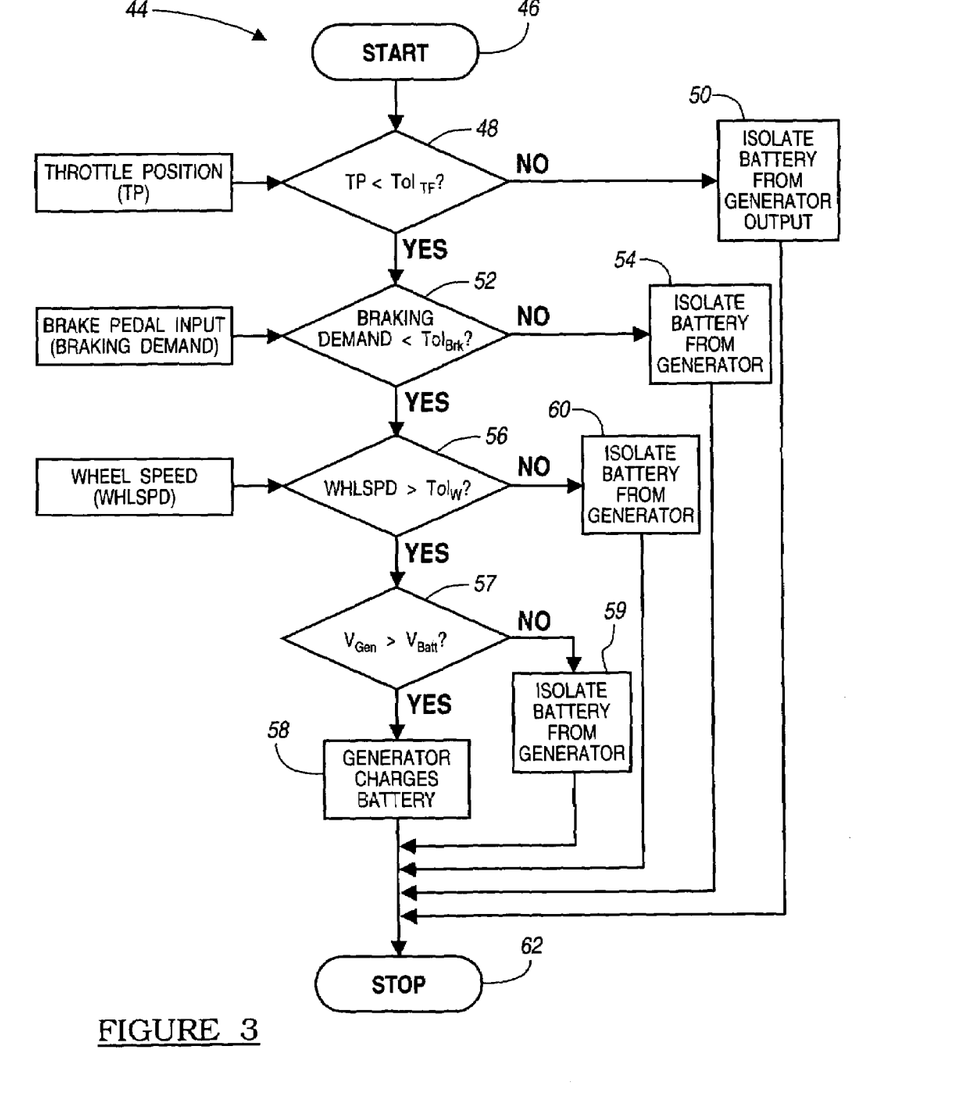
FIG. 3 is a flow chart illustrating a regenerative braking mode of operation for an electromagnetic and friction braking system according to the present invention.

FIG. 3 illustrates a regenerative braking method 44 for the electromagnetic and friction braking system 10 according to the present invention. A step 46 is the entrance into the regenerative braking method 44. At a step 48, the controller 28 receives a signal from the throttle position sensor 33. The controller 28 compares the throttle position signal (TP) to the predetermined throttle position threshold ($Tol_{TP}$). If the throttle position is greater than the predetermined throttle position threshold, a step 50 occurs. One skilled in the art will recognize that sensing the throttle position enhances braking performance and may be excluded without departing from the scope of the invention. At the step 50, the output of the generator 24 is applied to the front and rear eddy current devices 18 and 16. At the step 50, the generator is isolated from the battery. When the throttle position is less than the predetermined throttle position threshold, a step 52 occurs. At the step 52, the controller 28 receives signals from the braked pedal sensor referred to herein as the braking demand. The controller 28 compares the braking demand to the predetermined brake demand threshold ($Tol_{BRK}$) which corresponds to a predetermined brake pedal position. Preferably, the predetermined brake demand threshold is about 1 in/s². When the braking demand is greater than the predetermined brake demand threshold, a step 54 occurs. At the step 54, the generator 24 supplies power to the front and rear eddy current devices 18 and 16 without charging the battery 26. If the braking demand is less than the predetermined brake demand Threshold, a step 56 occurs. At the step 56, the controller receives a wheel speed sensor signal from the wheel speed sensor 37 that correspond to the speed of the front and rear wheels 14 and 12. The wheel speed (WhlSpd) is compared to a predetermined wheel speed threshold ($Tol_W$). Preferably, the predetermined wheel speed threshold is at least 50 revolutions per minute. When the wheel speed is less than the predetermined wheel speed threshold, a step 60 occurs. At the step 60, the output of the generator 24 is a plied to the front and rear eddy current devices 18 and 16. During the step 60, the battery 26 is isolated from the generator 24. If the wheel speed is greater than the predetermined wheel speed threshold, a step 57 occurs. In the step 57, the voltage of the generator 24 ($V_{GEN}$) is compared with the voltage of the battery 26 ($V_{BATT}$). The method isolates the battery from the generator to prevent battery charging when the generator voltage is less than the battery voltage in step 59. When the generator voltage is greater than the battery voltage, the generator charges the battery in step 58. In the step 58, the generator 24 produces an amount of power in excess of that required to power the front and rear eddy current devices 18 and 16. The controller 28 generates signals for the battery switch 32 thereby allowing the generator 24 to charge the battery 26. A step 62 completes each loop through the regenerative braking method 44.

Various other modifications to the present invention may occur to those skilled in the art to which the present invention pertains. Other modifications not explicitly mentioned herein are also possible and within the scope of the present invention.

What is claimed is:

1. A braking system for a vehicle having at least one wheel comprising;
    at least one battery capable of receiving and supplying power;
    a battery switch;
    a plurality of eddy current devices that provide a retarding to que to the wheel of the vehicle when energized;
    a throttle position sensor for sensing a throttle position of the vehicle;
    a brake pedal;
    a brake pedal sensor coupled to the brake pedal for generating a brake pedal position signal;
    a wheel speed sensor for determining the speed of the wheel and generating a wheel speed sensor signal;
    a generator for supplying power to the eddy current devices and the battery for charging when the brake pedal sensor senses that the vehicle operator has placed the brake pedal in a predetermined brake pedal position, the throttle position is less than a predetermined throttle position, and the wheel speed is greater than a predetermined wheel speed threshold; and
    a controller having memory storage capability, the controller for storing, a predetermined throttle position threshold, a predetermined brake pedal position, and a predetermined wheel speed threshold in memory and receiving inputs from the brake pedal sensor, the wheel speed sensor, a power nodule and the generator, and the controller for generating signals for the battery switch.

2. A braking system according to claim 1, wherein the eddy current devices are electromagnetic retarders.

3. A braking system according to claim 1, wherein the plurality of eddy current devices equals 4.

4. A braking system according to claim 1, wherein the generator has an operating voltage of about 42 volts.

5. A braking system according to claim 1, wherein the battery has a voltage of 36 volts.

6. A braking system according to claim 1, wherein the predetermined pedal position of the brake pedal is a depressed position.

7. A braking system control method for a vehicle having a generator, a battery, a brake pedal sensor, at least one wheel, and a wheel speed sensor, the method comprising the steps of:
    detecting a braking demand based on an input from the brake pedal sensor;
    comparing the braking demand to a predetermined brake demand threshold;
    decoupling the battery from the generator when the braking demand is greater than the predetermined brake demand threshold;
    detecting a wheel speed based on an input from the wheel speed sensor;
    comparing the wheel speed to a predetermined wheel speed threshold when the braking demand is less than the predetermined brake demand threshold;
    comparing the generator voltage to the battery voltage when the wheel speed is greater than the predetermined wheel speed threshold; and
    coupling the generator to the battery when the generator voltage is greater than the battery voltage thereby charging the battery.

8. A braking system control method for a vehicle having a generator, a battery, a brake pedal, and at least one wheel, a wheel speed sensor, the method comprising the steps of:
    detecting a throttle position based on inputs from a throttle position sensor;
    comparing the throttle position to a predetermined throttle position threshold;
    decoupling the battery from the generator when the throttle position is less than the predetermined throttle position threshold;
    detecting a braking demand based on inputs from the brake pedal sensor;
    comparing the braking demand to a predetermined brake demand threshold when the throttle position is greater than the predetermined throttle position threshold;
    decoupling the battery from the generator when the braking demand is greater than the predetermined brake demand threshold;
    detecting a wheel speed based on inputs from the wheel speed sensor;
    comparing the generator voltage to the battery voltage when the wheel speed is greater than the predetermined wheel speed threshold; and
    coupling the generator to the battery if the generator voltage is greater than the battery voltage to thereby charge the battery.

9. A braking system control method according to claim 8, wherein the predetermined throttle position ranges from 5 to 10 degrees from a non-depressed position.

10. A braking system control method for a vehicle having a generator, a battery, a brake pedal capable of generating a brake pedal position signal and at least one wheel, the method comprising the steps of:
    determining a throttle position based on inputs from a throttle position sensor;
    comparing the throttle position to a predetermined throttle position threshold;
    generating a first command signal for a battery switch to decouple the battery from the generator thereby preventing charging of the battery when the throttle position is greater than the predetermined throttle position threshold;
    comparing the brake pedal position signal based on the position of a brake pedal to a predetermined brake pedal position when the throttle position is less than the predetermined throttle position threshold;
    generating the first command signal for the battery switch to decouple the battery from the generator when the brake pedal position signal is greater than the predetermined brake pedal position and the throttle position is less than the predetermined throttle position threshold;

comparing a wheel speed sensor signal based on the wheel speed to a predetermined wheel speed threshold when the brake pedal position signal is less than the predetermined brake pedal threshold and the throttle position is less than the predetermined throttle position threshold;

generating the first command signal to for the battery switch to decouple the battery from the generator when the wheel speed is less than the predetermined wheel speed threshold, the brake pedal position signal is less than the predetermined brake pedal position, and throttle position is less than the predetermined throttle position threshold; and generating a second command signal to electrically couple the battery to the generator thereby enabling the generator to charge the battery when the wheel speed is greater than the predetermined wheel speed threshold, the throttle position is less than the predetermined throttle position threshold, and the brake pedal position signal is less than the predetermined brake pedal position.

11. A braking system control method according to claim 10, wherein the predetermined throttle position ranges from 5 to 10 degrees from a non-depressed position.

12. A braking system control method according to claim 10, wherein the predetermined brake pedal position is a depressed position.

13. A braking system control method according to claim 10, wherein the predetermined wheel speed threshold is at least 50 revolutions per minute.

* * * * *

UNITED STATES PATENT AND TRADEMARK OFFICE
CERTIFICATE OF CORRECTION

| | |
|---|---|
| PATENT NO. | : 7,029,077 B2 |
| APPLICATION NO. | : 10/644909 |
| DATED | : April 18, 2006 |
| INVENTOR(S) | : Sohel Anwar et al. |

It is certified that error appears in the above-identified patent and that said Letters Patent is hereby corrected as shown below:

<u>In the Claims</u>

Column 5, in claim 1, line 26, before "to the wheel of the vehicle" delete "to que" and substitute --torque-- in its place.

Signed and Sealed this

Thirty-first Day of October, 2006

JON W. DUDAS
*Director of the United States Patent and Trademark Office*